(12) United States Patent
Hardy

(10) Patent No.: US 6,414,747 B1
(45) Date of Patent: Jul. 2, 2002

(54) INFRARED PHOTODETECTOR APPARATUS FOR MEASURING PROJECTILE VELOCITY

(76) Inventor: Charles E. Hardy, 4242 W. Wyndemere Cir., Schnecksville, PA (US) 18078

( * ) Notice: Subject to any disclaimer, the term of this patent is extended or adjusted under 35 U.S.C. 154(b) by 0 days.

(21) Appl. No.: 09/484,373

(22) Filed: Jan. 14, 2000

(51) Int. Cl.[7] .............................. F41J 5/02; F41J 5/08; G01P 3/36
(52) U.S. Cl. .......................... 356/28; 273/371; 273/378
(58) Field of Search .................. 273/371, 378; 356/28

(56) References Cited

U.S. PATENT DOCUMENTS

| | | |
|---|---|---|
| 3,807,858 A | 4/1974 | Finch |
| 3,824,463 A | 7/1974 | Oehler |
| 4,030,097 A | 6/1977 | Gedeon |
| 4,128,761 A | 12/1978 | Oehler |
| 4,129,829 A | 12/1978 | McLellan |
| 4,180,726 A | 12/1979 | DeCrescent |
| 4,239,962 A | 12/1980 | Oehler |
| 4,574,238 A | 3/1986 | Weinlich |
| 4,837,718 A | 6/1989 | Alon |
| 4,845,690 A | 7/1989 | Oehler |
| 5,577,733 A | * 11/1996 | Downing ............. 273/348 |
| 5,637,866 A | * 6/1997 | Riener et al. ........ 250/229 |
| 5,988,645 A | * 11/1999 | Downing ............. 273/348 |

* cited by examiner

Primary Examiner—Stephen C. Buczinski
(74) Attorney, Agent, or Firm—Sanford J. Piltch

(57) ABSTRACT

A ballistic projectile velocity measurement apparatus including two screens spaced apart at a known fixed distance for providing time measurement start and stop signals indicative of the passage of a ballistic projectile through a light curtain formed by contiguous focused light beams from plural infrared light sources which causes a perturbation or fluctuation in the light intensity level received by one or more photo-optic sensors to calculate the speed or velocity of the ballistic projectile. A calculation and display unit for receiving the time measurement signals, calculating the speed or velocity of the ballistic projectile and storing and displaying the sensed and calculated information is connected to the screens and controlled by keyboard command.

5 Claims, 3 Drawing Sheets

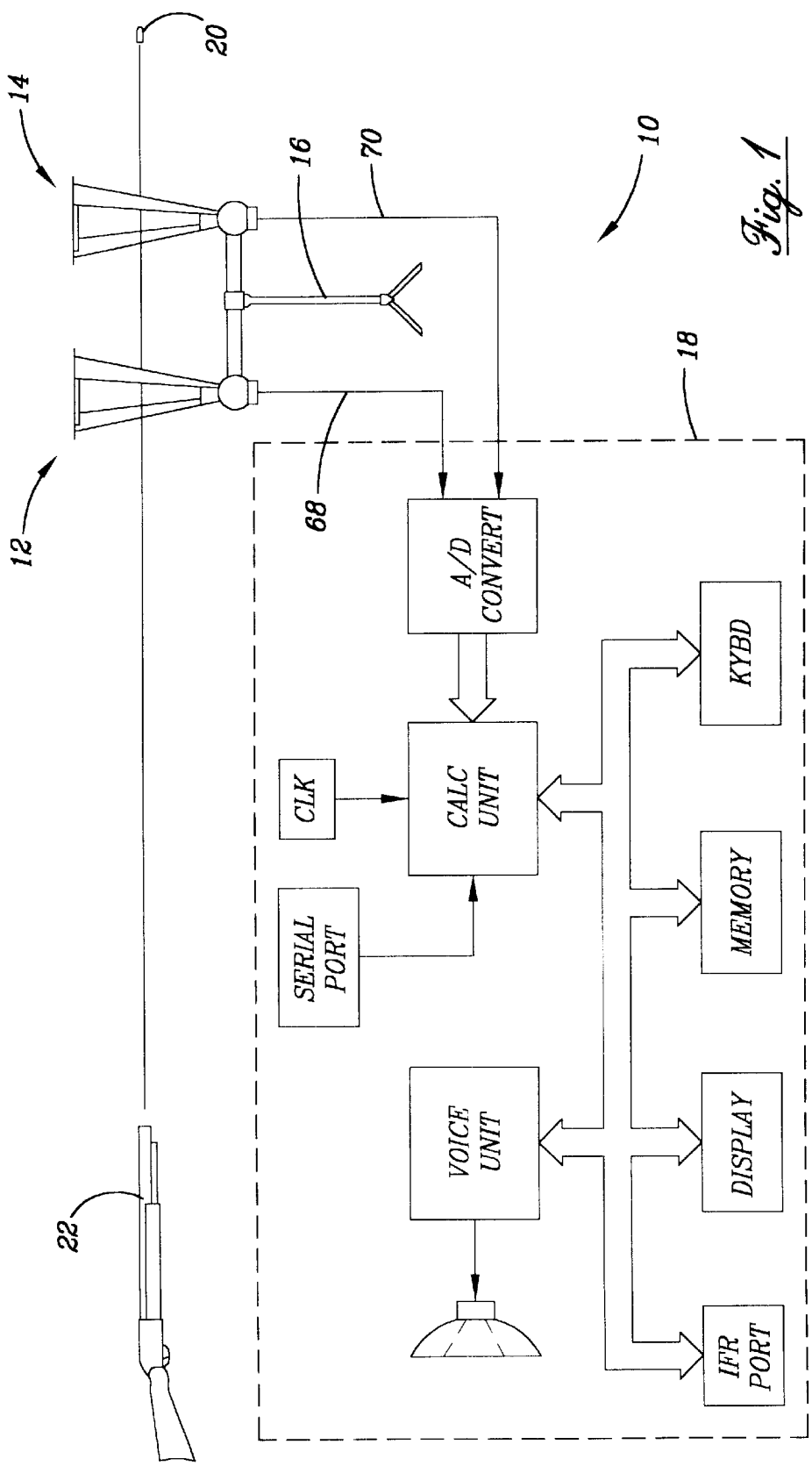

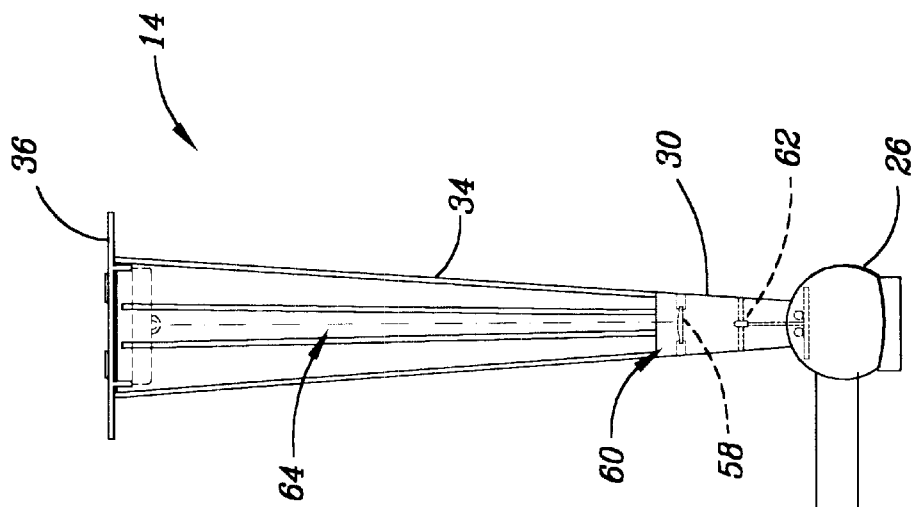
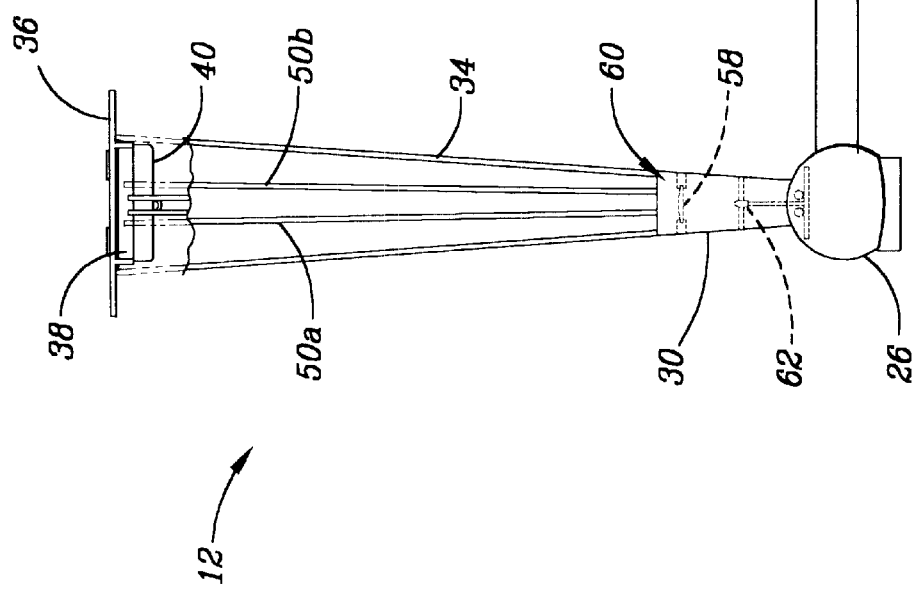

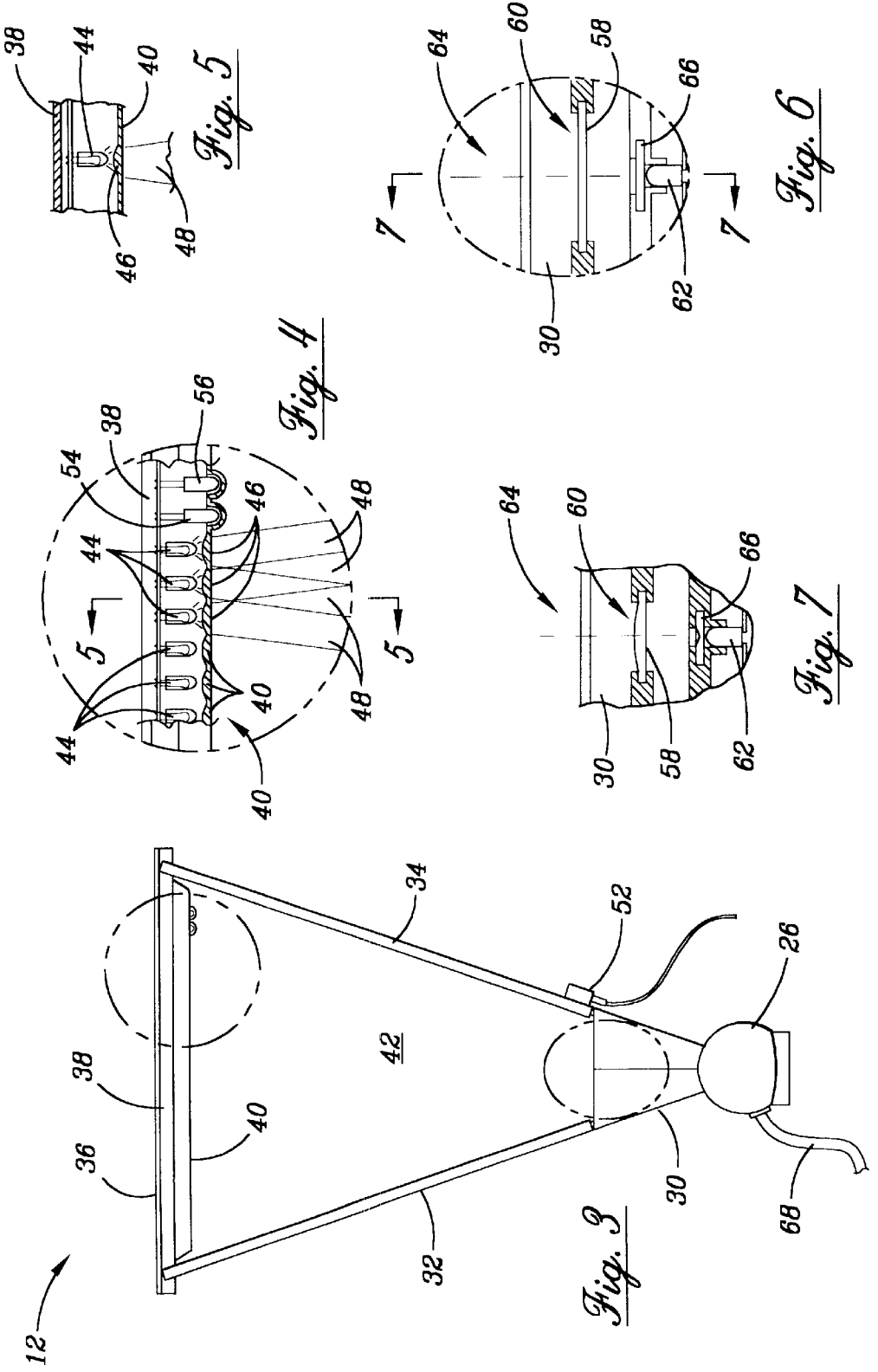

INFRARED PHOTODETECTOR APPARATUS FOR MEASURING PROJECTILE VELOCITY

BACKGROUND OF THE INVENTION

This invention relates to an apparatus utilizing infrared photo detection and associated electronic circuitry to determine the respective times when a ballistic projectile traverses through a focused infrared light curtain to calculate instantaneous speed, and thus, ballistic velocity.

In measuring ballistic projectile velocity, it has been common practice to use a pair of broad-band photodetectors spaced apart at a fixed known distance to produce, in turn, a signal to a common timing circuit at the point in time that a projectile interrupts the light detected by the photodetector indicating the projectile has just passed over each detector. The interval between each of the signals from the photodetectors indicating that a projectile has been detected and the known distance between the pair of photodetectors are used to compute the velocity of the ballistic projectile as it traversed the course, i.e. the distance, between the photodetector assemblies.

The assemblies housing the photodetectors, which are typically photo diodes or phototransistors, normally operate by having these receiving elements placed so that they can receive steady broad-band illumination from a constant light source such as the sun, specialty high intensity incandescent bulbs, or other broad-band light source. The photodetector assemblies are typically called "screen" in the ballistic projectile velocity measurement field for the reason that such assemblies have replaced earlier physical conducting grids or screens which recorded the passage of a projectile. Earlier screens were designed to utilize either incandescent light sources or ambient light from environmental sources, i.e. the sun. Screens utilizing ambient light from the sky required an optical slit, or other masking device, to restrict extraneous sources of light from being detected by the photodetectors.

With early photodetector assemblies, one typical problem encountered was that the illumination received by the photodetection receivers was not constant because of varying photoemission levels from the incandescent lamp or lamps, a varying amount of dust or other particles in the light transmission path between the source and the receiver, aging of the incandescent lamp filament, varying distances from the light source and the receiver, and varying atmosphere conditions and angles of the light source, i.e. the sun, in the case of sky screens. Particularly with regard to sky screens, the photosensitive receivers view only a segment of unobstructed sky through an optical slit which created a problem with the illumination level from the light source. On clear days, the illumination level was less than on hazy or partially obscured (cloudy) days and, for that reason, in order for a sky screen to properly operate under available light conditions, the light needed to be diffused, rather than be received directly from the source. Thus, while the optical slit created a partial focusing of the light, the diffuser element dispersed the direct light over a broader expanse, which also reduced potential problems from reflected light. Neither light source, incandescent or ambient, produced a constant, fixed level illumination source of light from which the photodetection receivers could detect the passage of a projectile because of the number of variables existing in the illumination source and from environmental conditions.

One environmental problem referenced above, i.e. reflected light, can cause a number of different types of misreadings by the photodetection receiver. When using ambient light from the sun, directed through an optical view slit (but without a diffuser), it was possible that the photodetector would respond because the circuit associated with that receiver was designed to detect any perturbation in the light level about the ambient level, regardless of the direction of that perturbation, lighter or darker. This is to say that reflected light from the projectile can be less than, approximately equal to or greater than the amount of diffused light blocked by that projectile. If the reflected light is significantly greater than or significantly less than the amount of diffused light blocked by the projectile, the photodetection receiver would react as described above. In the case in which the reflected light is approximately equal to the amount of the diffused light which reaches the photosensitive element in the absence of a projectile, the receiver sees no significant change in the light level even though the projectile is passing between the light source and the receiver. Thus, a shadow, which would be expected to fall across the photosensitive element or elements, is essentially obliterated by the reflected light. Due to the cancellation of the shadow, which occurs earlier then the calculation within the apparatus where a change in light level is converted to an electrical signal and a time tag is placed on the signal, there is no way to recover the lost information by using any substituted electrical signal processing technique.

Attempts to overcome the problems of insufficient light to cause a shadow to interrupt the light being detected by the photodetection receiver and from reflected light which causes inaccurate and/or incorrect detection have required apparatus measuring projectile velocity to include focusing arrays to direct light, which would otherwise disperse, to not disperse as quickly so that a greater level of illumination is presented to the photodetection receiver when the light source is ambient environmental light, i.e. the sun. The problem and the cure are described in U.S. Pat. No. 4,239,962 [Oehler] for "Sun Shield and Light Diffuser". This patent describes a sun shield for redirecting ambient light away from the photodetector/sensor so that only a small amount enters through an opening directly above the sensor and is then diffused to flood the area of the sensor with a light having substantially the same light intensity so that errors in sensing the passage of a projectile through low level light intensity and reflected "shadows" are substantially eliminated.

While it appears that the Oehler patent is the final word on using incandescent light or sunlight as the source of illumination for photodetection sensors or receivers, a different type of light, one which is not broad-band, was attempted. In U.S. Pat. No. 4,180,726 [De'Crescent] for "A System for Measuring Characteristics of an Object in Motion", the apparatus described uses pulsed infrared light beams to detect the passage of an object between the light beam source and the detector. Relatively low speed motion of balls involved in sports, sports apparatus swings, etc., are discussed but there is no mention of high speed or high velocity projectile measurement. This is largely due to the pulsing of the infrared beam which may be at the precise instant that the projectile traverses the path of the beam, when the beam is not present, and the detector will be unable to sense an interruption in the light beam.

Therefore, it is an object of the present invention to provide a ballistic projectile velocity measuring apparatus which has a more stable and constant light source for providing sufficient light intensity across the entire area within the screen or frame in order to be able to unfailingly detect the passage or traversal of the projectile through the screen as it impinges upon or traverses the light beam.

It is also a further object of the present invention to provide a contiguous series of light sources within the screen or frame to produce a special wavelength light beam emanating from above and traversing the internal area of the screen or frame downward to a photodetector/sensor array with the lightwave length selected so that the possibility of reflected light causing a sensing error is minimized.

It is still a further object of the present invention, in order to provide a more uniform illumination throughout the entire area within the screen of frame, to create a light curtain formed by multiple light sources of the special wavelength and the photodetector array which permits the detection of the passage or traversal of the projectile at any point through the light curtain.

It is also an object of the present invention to provide an apparatus to be linked to the screens or frames to receive the sensor information, time mark or tag that information, calculate the speed or velocity of the ballistic projectile, store such speed or velocity of the ballistic projectile in non-volatile memory and be able to control a display and recall all data and information regarding the time sensor data for the ballistic projectiles.

It is still a further object of the present invention to be able to provide a printed report of the time sensor data of the ballistic projectiles and to transfer information from the display and calculation apparatus to a multi-purpose computer and/or print reports of the time sensor data.

Other objects will appear hereinafter.

SUMMARY OF THE INVENTION

A ballistic projectile velocity measurement apparatus is described which includes two screens which are spaced apart at a known or fixed distance for providing time measurement start and stop signals indicative of the passage of a ballistic projectile through a light curtain formed by contiguous focused light beams from plural infrared light sources. The passage of a ballistic projectile through the light curtain will cause a perturbation or fluctuation in the light intensity level received by one or more photo-optic sensors. The detection and time measurement is used to calculate the speed or velocity of the ballistic projectile. A calculation and display unit for receiving the time measurement signals, calculating the speed or velocity of the ballistic projectile and storing and displaying the sensed and calculated information is connected to the screens and controlled by keyboard command is also described.

The invention may be best described as a measurement and calculation apparatus for measuring the time a ballistic projectile enters and exits a prescribed course, passing through preselected zones along the course. The apparatus includes first and second screens having sidewalls angled outward from a base and capped by a light shield. These screens are arranged in a sequential array downrange from a firearm shooting position and are positioned laterally across the intended shot line of a ballistic projectile. Infrared illumination means mounted below the light shield produce a light beam or curtain extending downward into and across substantially the entire area within each screen impinging upon an elongated rectangular slit in the top side each base. A plurality of photodetector sensors contained in each base below the rectangular slit are responsive to perturbations in the infra-red light made by the passage of a ballistic projectile through the light beam or curtain and, following detection of the light perturbation, generate timing signals indicative of the passage of the ballistic projectile. A calculation and display means is responsive to the timing signals from the photodetector sensors in the first and second screens for measuring the time interval between the respective passages of a ballistic projectile through the light curtain or beam in each of the first and second screens for calculating a speed corresponding to the measured time and the distance between the first and second screens for each ballistic projectile so measured. The calculation and display means also stores and displays the calculated speed associated with each ballistic projectile in turn.

The infra-red illumination means is comprised of a plurality of individual light sources capable of producing light in the infra-red wavelengths mounted across the lateral dimension of the screen immediately below the sun shield with an associated lens juxtaposed opposite each one of the plurality of light sources for focusing the produced light into convergent beams which overlap one another and form said light curtain. The photodetector sensor means is comprised of a focusing lens to receive the light passing through the slit in the top of the base which causes that portion of the infra-red light curtain passing through the slit to converge and be passed onto a photosensor capable of detecting perturbations in the infra-red light. Additionally, a diverging lens may be positioned between the focusing lens and the photosensor to cause the light beam to slightly diverge to encompass the lens of the photosensor.

The calculation and display means, which is responsive to said timing signals from the photodetector sensor means in the first and second screens, is also capable of causing the calculated speed to be aurally expressed by a voice modulator. Further, the calculation and display means can receive commands from an associated keyboard, link with a personal computer through a communications port, and transfer data to a printer through an infra-red port for printing reports containing the stored information.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 1 is a diagrammatic view of a firearm propelling a ballistic projectile which path traverses paired detector screens which are linked to a time sensor calculation and display apparatus represented in block diagram form.

FIG. 2 is a side elevational view of the paired set of screens of the present invention partially broken away to show internal components.

FIG. 3 is a front view of one screen of the present invention showing the structural components of the screen.

FIG. 4 is an enlarged view of a segment of the shade and light source of the screen partially broken away to show the plural special wavelength light sources, focusing screen and indicator lamps.

FIG. 5 is a sectional view taken along Line 5—5 of FIG. 4.

FIG. 6 is an enlargement of the photodetector/sensor array of the present invention.

FIG. 7 is a sectional view taken along Line 7—7 of FIG. 6.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Referring now to the drawings in detail, where like numerals refer to like parts or elements, there is shown in FIG. 1 an apparatus for measuring ballistic projectile velocity 10 which includes a paired set of screens 12, 14 mounted on a tripod or support 16 and connected to calculation/display unit 18. The ballistic projectile velocity measuring apparatus 10 is designed to sense and record the traversal of a ballistic projectile 20, which has been propelled from a firearm 22, as it traverses through each screen 12, 14, in turn. As the invention deals more specifically with the particular structure and arrangement of elements within the screens 12, 14, a description of those elements included within the paired set of screens follows.

With reference to FIGS. 2 and 3, there is shown a paired set of screens 12, 14 which are mounted at opposite ends of extendible arm 24 of tripod or support 16. Each of the screens 12, 14 are substantially identical in construction, and reference will be made either to screen 12 or to screen 14, as may be necessary, to show the precise structural placement or view the described element so that a complete understanding of the arrangement and interaction of the structure and elements is possible.

Each screen 12, 14 has at its bottom respective bases 26 which are mounted at opposite ends of the extendible arm 24, which arm is extended so that the screens 12, 14 are separated by a fixed, known distance. Extending upward from each base 26 is a housing 30 which contains the photodetector/sensor array, which array will be described in more detail below. Extending upward from either side of the housing 30, are side supports 32, 34 which slant outwards from the vertical at a desired acute angle. Atop, and joining, the sidewalls 32, 34 is a sun shield 36 which serves the purpose of shielding the area within the screens 12, 14 and the photodetector/sensor array from extraneous light other than the light intended to illuminate that area. Immediately below the sun shield 36 is the illumination assembly 38 housing the array of plurality of light sources and the lens/diffuser 40 which extends downward into the area bounded by the sidewalls 32, 34, the housing 30 and the sun shield 36. Within the space 42, the special limited bandwidth light beams emanating from the plurality of light sources creates a virtual light curtain through which the ballistic projectile will traverse.

Referring now to FIGS. 4 and 5, the plurality of light sources 44 are arrayed along the length of assembly 38 and aligned in a straight line from sidewall 32 to sidewall 34. Directly juxtaposed to each of the light sources 44 is the lens/diffuser 40 which precisely locates lens 46 directly opposite each light source 44. The lens 46 focuses the light emanating from the light source 44 into a converging beam 48 which is designed to expand (over the distance to the housing 30) to no wider than the width of the housing 30. See FIG. 5. The slightly diverging light beam 48 emanating from light source 44 and traversing through lens 46 creates a light curtain in combination with neighboring light beams 48, as shown in FIG. 4, with the example of three adjoining light sources 44 emanating light through the respective opposite lenses 46 and showing laterally adjoining light beams 48 beginning to overlap so that the light beams are coextensive by the time they reach the bottom of space 42. Each of the lenses 46 is designed to cause minimal divergence of the light beam over the required distance to retain the integrity of the light beam, and to retain the illumination levels necessary for proper sensing of the traversal of the ballistic projectile through the light curtain.

The plurality of light sources 44 are preferred to provide an infrared light wavelength, which is intensified through the lens/diffuser 40 to produce the light curtain principally across the top of the housing 30. The infrared light source has been selected and enhanced by using the lens/diffuser 40 to create an illumination system which will have the fewest possibilities of inherent problems with the light source and reflected light as encountered by earlier ballistic projectile measurement systems.

Referring back to FIG. 2, the plurality of light sources 44 is energized or powered by two conducting strips 50a, b which extend upward into the illumination assembly 38 and provide power to each of the lamps 44. Power is applied to the conducting strips 50a, b through power connection 52 (see FIG. 3) which is connected either to a battery pack or to a transformer (not shown) for supplying suitable electrical power to the illumination assembly 38.

Indicator lamps 54, 56 indicate that no power is present if neither indicator lamp is illuminated, a low battery condition if the red indicator lamp 54 is illuminated and sufficient power is present if the green indicator lamp 56 is illuminated. Suitable power sources are direct or transformed 9 or 12 volts dc for the illumination assembly 38.

At the bottom of space 42, within housing 30, is the photodetector array which is mounted below a focusing lens extending across a rectangular slit 60 The rectangular slit 60 permits only the highest intensity portion of the light beam to pass through to the photo-optic sensor 62 mounted directly below. As can be seen from FIG. 2 (screen 14), the light curtain 64, which emanates from the plurality of light sources 44, passes through the lens/diffuser 40, and impinges upon the focusing lens 48, traverses through focusing lens 48 and impinges upon clear protective window 66 which shields photo-optic sensor 62 from dust and other particulate matter while substantially completely passing the selected light wavelength, infrared light, through to the sensor. The light curtain is represented by the dashed line shown as 64 even though the light curtain may be formed of a beam which has more than the representative width shown. The focusing lens 58 is oriented so that its convex upper surface directs the light impinging upon that surface inward so that the light beam converges more intensely over the photo-optic sensor 62. The protective window 66 may have flat surfaces on both its top and bottom surfaces, but may also include a concave upper surface area which may cause the slight divergence of the light beam so that the entire surface area of the photo-optic sensor 62 receives substantially the same level of illumination from the light curtain 64. Reference should be had to FIGS. 2, 6 and 7 to further one's understanding of the foregoing description.

In operation, each of the screens 12, 14 provide a source of infrared light from the plurality of light sources 44 which is focused into a convergent beam 48 from each of the respective light sources 44 which collectively form light curtain 64. The light curtain 64 passes through and bisects (in the vertical direction from front to back) the area or space 42 bounded by the sidewalls 32, 34, the sun shield 36 and the housing 30 to impinge upon an elongated rectangular slit 60 within the housing. The slit 60 contains a focusing lens 58 which causes the convergence or intensifying of the illumination beam from light curtain 64, focusing that intensified beam onto the protective window 66 to be detected by photo-optic sensor 62.

With all of the electro-optical source and sensors fully functioning, a ballistic projectile propelled from firearm 22 can traverse through the area 42, and through the light curtain 64, causing a light perturbation or interruption in the illumination level to the photo-optical sensor 62. When the sensor detects even the slightest fluctuation of light level, a signal is created which is indicative of the detection of the ballistic projectile and is used to start a timing circuit in the calculation/display unit 18. When the ballistic projectile traverses through the area 42 of screen 14, and traverses the light curtain 64, the same perturbation or fluctuation in light level will occur and will be detected by photo-optic sensor 62 and a second signal indicative of detection of a ballistic projectile will be sent to the calculation/display unit 18 and cause a stop timing signal to be received. It should be understood that the photo-optic sensor 62 may be a single sensor or a plurality of light sensors, and this description is to be understood to embody any electro-optic sensor which can detect an infrared light source and is operable within a circuit to show a fluctuation in the light intensity received and detected.

The screens 12, 14, while powered separately from the calculation/display or main control unit 18, are connected to the calculation display unit 18 by means of cables 68, 70, respectively. The cables 68, 70 carry the timing signals from photo-optic sensors 62 indicative of the detection of the passage of a ballistic projectile 20 through the respective light curtains 64 in each of screens 12, 14. The timing signals carried by cable 68, 70 from the respective screens 12, 14 are converted from their analog values to digital representations of those values and inputted into the calculation unit which houses a pre-programmed microcomputer or microprocessor which includes a counter/timer (receiving precise clock pulses from an external clock source) to precisely calculate to thousandths of a second the time between the start timing signal and the stop timing signal, and to use that measured time to calculate the speed or velocity of a ballistic projectile 20. The program in the calculation unit permits the immediate storage of the measured time and the calculated speed or velocity of the ballistic projectile 20, and can store and recall a series of successive measurements and calculations pertaining to each of a series of ballistic projectiles 20 passing through the screens 12, 14. Further, the microprocessor is programmed to instantaneously display, upon measurement and calculation, the values associated with the measured time and calculated speed or velocity of each ballistic projectile 20 on an associated liquid crystal display. A keyboard is provided to initiate command instructions which are pre-programmed to be accepted by the microprocessor in order to cause the display to retrieve previously stored data pertaining to measured times and calculated speeds and velocities of one or more ballistic projectiles 20.

The calculation/display unit 18 can also be commanded, through the keyboard, to print out a report through an infrared printer port provided along the side of the control unit 18. In addition, the microprocessor is programmed to provide a voice output through a voice modulation unit and speaker housed within the calculator/display unit 18 so that the measured time and calculated speed and velocity can be heard, as well as seen, on the display. An additional feature is a serial port connection with a personal computer so that data can be exchanged between the calculation/display unit 18 and the personal computer through the serial port.

Some of the features which can be obtained from the calculator/display unit 18 once the time measurement and calculation of speed or velocity are accomplished are to provide a high, a low, and an average velocity for a series of measurements; a maximum spread showing the highest and lowest velocities; a standard deviation calculation to provide a mean, a change in display to represent velocity in decimeters instead of meters; and to provide a varying measurement and storing capacity in meters or in feet per second. The calculation/display unit 18 also provides the ability to edit or to omit certain data which has been incorrectly stored, or incorrectly transmitted as a measurement such as in the case of a ballistic projectile 20 which traverses the light curtain 64 extremely close to a sidewall 32, 34 or extremely close to the illumination assembly 38.

The calculator/display unit 18 is capable of displaying on the LCD display the following information concurrently: the calculated speed or velocity of the last fired ballistic projectile 20, the number of measured speeds or velocities, i.e. shots, recorded in the current series, the fixed distance between the screens in either feet or meters, and whether there has been an error detected by the control unit 18 in the present measurement or calculation. Also displayed concurrently is the current function to be displayed, the 10X decimeter function indicator and a low battery warning indicator.

The calculation/display unit 18 is programmed with an automatic shut-down mode so that it will turn itself off if not being used after a predetermined time without any loss of stored information as it is provided with a permanent memory back-up so that information cannot be lost unless all power sources are simultaneously removed. The memory capacity of the calculation/display unit 18 provides for the storage of a large number of shot timing measurements and velocity/speed calculations, as well as series of such shots over an extended period of time so that competitive information can be stored, and compared, from one shooting competition to another, or from one firearms testing cycle to another.

The present invention may be embodied in other specific forms without departing from the spirit or essential attributes thereof and, accordingly, the described embodiments are to be being indicated by the appended claims, rather than the foregoing detailed description, as indicating the scope of the invention as well as all modifications which may fall within a range of equivalency which are also intended to be embraced therein.

I claim:

1. A measurement and calculation apparatus for measuring the time a ballistic projectile enters and exits a prescribed course, passing through preselected zones along the course, comprising:

first and second screens having sidewalls angled outward from a base and capped by a light shield arranged in a sequential array downrange from a firearm shooting position, said first and second screens positioned laterally across the intended shot line of a ballistic projectile;

infra-red illumination means mounted below the light shield for producing a focused light curtain extending downward into and across substantially the entire area within each screen impinging upon an elongated rectangular slit in the top side of each base;

a plurality of photodetector sensor means contained in each base below said slit responsive to perturbations in the infra-red light curtain made by the passage of a ballistic projectile through the curtain for generating timing signals indicative of the passage of the ballistic projectile; and means responsive to said timing signals from the photodetector sensor means in the first and second screens for measuring the time interval between the respective passages of the ballistic projectile through the light curtain in each of the first and second screens, for calculating a speed corresponding to the measured time and the distance between the first and second screens for each ballistic projectile so measured, and for storing and displaying the calculated speed associated with each ballistic projectile in turn.

2. The apparatus of claim 1, wherein the infra-red illumination means comprises a plurality of individual light sources capable of producing light in the infra-red wavelengths mounted across the lateral dimension of the screen immediately below the light shield with an associated lens juxtaposed opposite each one of the plurality of light sources for focusing the produced light into convergent beams which overlap one another and form said light curtain.

3. The apparatus of claim 1, wherein the photodetector sensor means comprises a focusing lens to receive the light passing through the slit in the top of the base to cause the portion of the infra-red light curtain passing through the slit to converge and be passed onto a photosensor capable of detecting perturbations in the infra-red light.

4. The apparatus of claim 3, wherein a diverging lens is positioned between the focusing lens and the photosensor to cause the light beam to slightly diverge to encompass the lens of the photosensor.

5. The apparatus of claim 1, wherein the means responsive to said timing signals from the photodetector sensor means in the first and second screens is capable of causing the calculated speed to be aurally expressed by a voice modulator.

* * * * *